United States Patent
Duo et al.

(10) Patent No.: US 12,543,047 B2
(45) Date of Patent: Feb. 3, 2026

(54) STREAMLINED CREATION AND EXPANSION OF A WIRELESS MESH NETWORK

(71) Applicant: SONICWALL INC., Milpitas, CA (US)

(72) Inventors: Zhuangzhi Duo, Fremont, CA (US); Atul Dhablania, San Jose, CA (US)

(73) Assignee: SonicWALL Inc., Milpitas, CA (US)

( * ) Notice: Subject to any disclaimer, the term of this patent is extended or adjusted under 35 U.S.C. 154(b) by 43 days.

(21) Appl. No.: 18/753,727

(22) Filed: Jun. 25, 2024

(65) Prior Publication Data

US 2024/0349058 A1 Oct. 17, 2024

Related U.S. Application Data

(63) Continuation of application No. 16/404,655, filed on May 6, 2019, now Pat. No. 12,022,295, which is a
(Continued)

(51) Int. Cl.
*H04W 12/50* (2021.01)
*H04L 9/40* (2022.01)
(Continued)

(52) U.S. Cl.
CPC ......... *H04W 12/50* (2021.01); *H04L 63/0807* (2013.01); *H04W 4/80* (2018.02);
(Continued)

(58) Field of Classification Search
None
See application file for complete search history.

(56) References Cited

U.S. PATENT DOCUMENTS

| 7,215,926 | B2 | 5/2007 | Corbett et al. |
| 7,576,646 | B2 | 8/2009 | Hayden et al. |

(Continued)

FOREIGN PATENT DOCUMENTS

| CA | 2978928 | 3/2018 |
| CN | 101807998 | 8/2010 |

(Continued)

OTHER PUBLICATIONS

Paltasingh, S.—Eindhoven University of Technology; (Secure commissioning in ad-hoc Wi-Fi Mesh networks); pp. 145; Published in Oct. 2017.*

(Continued)

*Primary Examiner* — Ali H. Cheema
(74) *Attorney, Agent, or Firm* — Patent Capital Group

(57) ABSTRACT

Methods, systems, computer readable storage medium and apparatus, as described herein, registers and configures mesh node devices to operate in a wireless mesh network as part of a process that may be referred to as an onboarding process. Such an onboarding process may store registration information and configuration information in a database at a computer in the cloud or that is accessible via the Internet. This stored information may be used to easily create or expand a wireless mesh network. This registration information may be cross-referenced with a profile associated with a network configuration, with a customer license, and with an identifier that identifies a wireless mesh network. Profiles consistent with the present disclosure may identify configuration preferences of a wireless mesh network and may identify software

22 Claims, 7 Drawing Sheets

Related U.S. Application Data continuation-in-part of application No. 16/397,935, filed on Apr. 29, 2019, now Pat. No. 10,972,916.

(51) Int. Cl.
*H04W 4/80* (2018.01)
*H04W 60/00* (2009.01)
*H04W 76/11* (2018.01)
*H04W 80/10* (2009.01)
*H04W 12/55* (2021.01)
*H04W 84/18* (2009.01)

(52) U.S. Cl.
CPC ............ *H04W 60/00* (2013.01); *H04W 76/11* (2018.02); *H04W 80/10* (2013.01); *H04L 63/102* (2013.01); *H04W 12/55* (2021.01); *H04W 84/18* (2013.01)

(56) References Cited

U.S. PATENT DOCUMENTS

| | | |
|---|---|---|
| 8,189,608 B2 | 5/2012 | Duo et al. |
| 9,071,416 B2 | 6/2015 | Liu et al. |
| 9,407,624 B1 | 8/2016 | Myers et al. |
| 9,521,145 B2 | 12/2016 | Bhatt et al. |
| 9,807,621 B1 | 10/2017 | Hui et al. |
| 9,955,526 B1 | 4/2018 | Yu |
| 10,057,227 B1 | 8/2018 | Hess et al. |
| 10,142,122 B1 | 11/2018 | Hill |
| 10,382,203 B1 | 8/2019 | Loladia et al. |
| 10,397,013 B1 | 8/2019 | Hill et al. |
| 10,506,436 B1 | 12/2019 | Newman et al. |
| 10,531,299 B1* | 1/2020 | Osborn ................. H04W 12/63 |
| 10,764,128 B2 | 9/2020 | Kozura et al. |
| 10,972,916 B2 | 4/2021 | Duo |
| 11,128,612 B1 | 9/2021 | Loladia |
| 11,405,789 B1 | 8/2022 | Wei |
| 11,638,149 B2 | 4/2023 | Duo et al. |
| 11,997,635 B2 | 5/2024 | Duo et al. |
| 12,022,295 B2 | 6/2024 | Duo |
| 12,075,246 B2 | 8/2024 | Duo |
| 12,279,115 B2 | 4/2025 | Duo et al. |
| 12,376,062 B2 | 7/2025 | Duo et al. |
| 2004/0243840 A1 | 12/2004 | Tran |
| 2004/0266449 A1 | 12/2004 | Smetters et al. |
| 2006/0010199 A1 | 1/2006 | Brailean et al. |
| 2006/0245373 A1 | 11/2006 | Bajic |
| 2007/0070943 A1 | 3/2007 | Livet et al. |
| 2007/0275701 A1 | 11/2007 | Jonker |
| 2008/0063204 A1 | 3/2008 | Braskich et al. |
| 2008/0101291 A1 | 5/2008 | Jiang et al. |
| 2009/0077601 A1 | 3/2009 | Brailean et al. |
| 2009/0307343 A1 | 12/2009 | Kumagai |
| 2010/0066839 A1 | 3/2010 | Azuma et al. |
| 2010/0122330 A1 | 5/2010 | McMillan et al. |
| 2010/0217881 A1 | 8/2010 | Iino |
| 2010/0309781 A1 | 12/2010 | Wang et al. |
| 2011/0055558 A1 | 3/2011 | Liu et al. |
| 2011/0138183 A1 | 6/2011 | Reddy et al. |
| 2011/0211511 A1 | 9/2011 | Bakthavathsalu et al. |
| 2012/0190341 A1 | 7/2012 | Gupta et al. |
| 2012/0222099 A1 | 8/2012 | Narendra et al. |
| 2012/0257536 A1 | 10/2012 | Kholaif et al. |
| 2013/0076491 A1* | 3/2013 | Brandsma ......... H04W 52/0229 340/10.3 |
| 2013/0152169 A1 | 6/2013 | Stuntebeck |
| 2013/0167196 A1 | 6/2013 | Spencer et al. |
| 2013/0262873 A1 | 10/2013 | Read et al. |
| 2013/0318343 A1 | 11/2013 | Bjarnason et al. |
| 2013/0322281 A1* | 12/2013 | Ludlow ................. H04W 48/18 370/252 |
| 2014/0040618 A1 | 2/2014 | Liu et al. |
| 2014/0071837 A1 | 3/2014 | Werb et al. |
| 2014/0115673 A1 | 4/2014 | Haynes et al. |
| 2014/0128057 A1 | 5/2014 | Siomina et al. |
| 2014/0185457 A1 | 7/2014 | Barnes et al. |
| 2014/0274056 A1 | 9/2014 | Hyde et al. |
| 2015/0065093 A1 | 3/2015 | Schmidt |
| 2015/0180842 A1 | 6/2015 | Panther |
| 2015/0244706 A1 | 8/2015 | Grajek et al. |
| 2015/0372875 A1 | 12/2015 | Turon et al. |
| 2015/0373691 A1* | 12/2015 | Turon ................... H04W 40/32 370/329 |
| 2015/0373750 A1 | 12/2015 | Turon et al. |
| 2015/0373751 A1 | 12/2015 | Turon et al. |
| 2015/0373752 A1 | 12/2015 | Turon et al. |
| 2015/0373753 A1* | 12/2015 | Turon ................... H04W 84/18 370/254 |
| 2016/0029290 A1 | 1/2016 | Turon et al. |
| 2016/0037573 A1 | 2/2016 | Ko et al. |
| 2016/0073252 A1 | 3/2016 | Spencer et al. |
| 2016/0087957 A1 | 3/2016 | Shah et al. |
| 2016/0095153 A1 | 3/2016 | Chechani et al. |
| 2016/0105424 A1 | 4/2016 | Logue et al. |
| 2016/0134932 A1 | 5/2016 | Karp et al. |
| 2016/0147506 A1 | 5/2016 | Britt et al. |
| 2016/0182459 A1 | 6/2016 | Britt et al. |
| 2016/0219039 A1 | 7/2016 | Houthooft et al. |
| 2016/0294828 A1 | 10/2016 | Zakaria |
| 2016/0295364 A1 | 10/2016 | Zakaria |
| 2016/0349127 A1 | 12/2016 | Britt |
| 2016/0352729 A1 | 12/2016 | Malik |
| 2017/0006528 A1 | 1/2017 | Bari |
| 2017/0006643 A1 | 1/2017 | Zakaria et al. |
| 2017/0034692 A1 | 2/2017 | Spencer et al. |
| 2017/0048280 A1 | 2/2017 | Logue et al. |
| 2017/0169640 A1 | 6/2017 | Britt |
| 2017/0171200 A1 | 6/2017 | Bao |
| 2017/0171747 A1 | 6/2017 | Britt et al. |
| 2017/0195136 A1 | 7/2017 | Ghosh et al. |
| 2017/0245145 A1 | 8/2017 | Choi et al. |
| 2017/0346836 A1 | 11/2017 | Holland et al. |
| 2017/0347264 A1 | 11/2017 | Holland et al. |
| 2017/0359417 A1 | 12/2017 | Chen et al. |
| 2018/0007140 A1 | 1/2018 | Brickell et al. |
| 2018/0019929 A1 | 1/2018 | Chen et al. |
| 2018/0063714 A1 | 3/2018 | Stephenson |
| 2018/0091506 A1 | 3/2018 | Chow et al. |
| 2018/0102032 A1 | 4/2018 | Emmanuel et al. |
| 2018/0124039 A1 | 5/2018 | Grajek et al. |
| 2018/0159855 A1 | 6/2018 | Ha et al. |
| 2018/0189507 A1 | 7/2018 | Wakai |
| 2018/0262497 A1* | 9/2018 | Raje ..................... G06F 21/35 |
| 2018/0270094 A1 | 9/2018 | Swengler |
| 2018/0293367 A1 | 10/2018 | Urman |
| 2018/0314808 A1 | 11/2018 | Casey et al. |
| 2018/0316670 A1 | 11/2018 | Brown |
| 2018/0317266 A1 | 11/2018 | Britt et al. |
| 2018/0367383 A1 | 12/2018 | Hardison et al. |
| 2019/0028467 A1 | 1/2019 | Oberheide et al. |
| 2019/0028988 A1 | 1/2019 | Yao et al. |
| 2019/0037613 A1 | 1/2019 | Anantharaman et al. |
| 2019/0087568 A1 | 3/2019 | Kim et al. |
| 2019/0089806 A1* | 3/2019 | Deshpande ............ H04W 48/12 |
| 2019/0109713 A1 | 4/2019 | Clark et al. |
| 2019/0132303 A1 | 5/2019 | Kurian |
| 2019/0141655 A1 | 5/2019 | Stricklen |
| 2019/0150134 A1 | 5/2019 | Kakinada et al. |
| 2019/0182243 A1 | 6/2019 | Tjahjono et al. |
| 2019/0182666 A1 | 6/2019 | Kotay |
| 2019/0238539 A1 | 8/2019 | Arora et al. |
| 2019/0245713 A1 | 8/2019 | Lo et al. |
| 2019/0253243 A1 | 8/2019 | Zimmerman et al. |
| 2019/0253893 A1 | 8/2019 | Hodroj |
| 2019/0259260 A1 | 8/2019 | Amini et al. |
| 2019/0281053 A1 | 9/2019 | Brown et al. |
| 2019/0319849 A1* | 10/2019 | Slupik .................. H05B 47/199 |
| 2019/0350021 A1 | 11/2019 | Blum |
| 2019/0357023 A1 | 11/2019 | Park |
| 2019/0364034 A1 | 11/2019 | Alexander |
| 2019/0386981 A1 | 12/2019 | Ramesh Kumar et al. |
| 2020/0007607 A1 | 1/2020 | Maxilom et al. |
| 2020/0015319 A1 | 1/2020 | Chen et al. |
| 2020/0044851 A1 | 2/2020 | Everson et al. |

(56) References Cited

U.S. PATENT DOCUMENTS

| | | | |
|---|---|---|---|
| 2020/0068483 A1 | 2/2020 | Likar et al. | |
| 2020/0092701 A1 | 3/2020 | Arnberg et al. | |
| 2020/0099896 A1 | 3/2020 | Galvin et al. | |
| 2020/0154448 A1 | 5/2020 | Wilmunder | |
| 2020/0169460 A1 | 5/2020 | Bartlett et al. | |
| 2020/0169549 A1 | 5/2020 | Smith | |
| 2020/0186998 A1 | 6/2020 | Smith et al. | |
| 2020/0304372 A1 | 9/2020 | Henry et al. | |
| 2020/0336476 A1 | 10/2020 | Polese Cossio et al. | |
| 2020/0344599 A1 | 10/2020 | Duo | |
| 2020/0344608 A1 | 10/2020 | Duo | |
| 2020/0359349 A1 | 11/2020 | Duo | |
| 2020/0396613 A1 | 12/2020 | Duo | |
| 2020/0412733 A1 | 12/2020 | Leon | |
| 2021/0056179 A1 | 2/2021 | Hiratsuka | |
| 2021/0068198 A1 | 3/2021 | Michielsen et al. | |
| 2021/0227391 A1 | 7/2021 | Duo | |
| 2021/0400758 A1 | 12/2021 | Kao et al. | |
| 2022/0046397 A1* | 2/2022 | Collins | H04W 4/50 |
| 2023/0362645 A1 | 11/2023 | Duo et al. | |
| 2024/0323889 A1 | 9/2024 | Duo | |
| 2024/0422543 A1 | 12/2024 | Duo et al. | |

FOREIGN PATENT DOCUMENTS

| | | |
|---|---|---|
| CN | 101431519 | 6/2011 |
| CN | 102804200 | 11/2012 |
| CN | 102804201 | 11/2012 |
| CN | 103888941 | 6/2014 |
| CN | 104365122 | 2/2015 |
| CN | 105207987 | 12/2015 |
| CN | 106100848 | 11/2016 |
| CN | 107113326 | 8/2017 |
| CN | 108029069 | 5/2018 |
| CN | 109379770 | 2/2019 |
| CN | 109787825 | 5/2019 |
| CN | 110024422 | 7/2019 |
| CN | 107204972 | 5/2020 |
| CN | 108694306 | 3/2024 |
| JP | 2016072716 | 5/2016 |
| KR | 20070082209 | 8/2007 |
| KR | 2016-0091624 | 8/2016 |
| KR | 2018-0094985 | 8/2018 |
| KR | 20190105776 | 9/2019 |
| TW | 201743625 | 12/2017 |
| TW | 201810099 | 3/2018 |
| WO | WO 2017/053048 | 3/2017 |
| WO | WO 2017/126282 | 7/2017 |
| WO | WO 2018/208289 | 11/2018 |

OTHER PUBLICATIONS

Thomas Hardjono and Ned Smith (Cloud-Based Commissioning of Constrained Devices using Permissioned Blockchains); pp. 8; Published in May 30, 2016.*

U.S. Appl. No. 18/816,879, filed Aug. 27, 2024, US, Zhuangzhi Duo, Securing Transmission Paths in a Mesh Network.

Akyildiz et al., Ian F., Wang, Xudong, Wang, Weilan, "Wireless mesh networks: a survey", Science Direct, Computer Networks Jan. 1, 2005.

Al-Fairuz et al., Mohamed, "Multi-channel, Multi-level Authentication for More Secure eBanking" pp. 8; Jul. 3, 2017.

Bontu, Chandra S., Peryalwar, Shalini, and Pecen, Mark; "Wireless Wide-Area Networks for Internet of Things", IEEE Vehicular Technology Magazine, IEEE Xplore, Published Jan. 31, 2014, 10 pages.

"Building a Rurul Wireless Mesh Network" by David Johnson, Karel Matthee, Dare Sokoya, Lawrence Mboweni, Ajay Makan, and Heng Kotze, pp. 44; Oct. 30, 2007.

Chowdhury, Kaushik R.; "Cognitive Wireless Mesh Networks with Dynamic Spectrum Access", Student Member, IEEE, and Ian F. Akyildiz, Fellow, IEEE. IEEE Journal on Selected Areas in Communications, vol. 26, No. 1, Jan. 2008, pp. 14.

Khudoyberdiev et al., Azimbek; "A Novel Approach towards Resource Auto-Registration and Discovery of Embedded Systems Based on DNS", Electronics, Published Apr. 17, 2019.

Renaud et al., Karen "A Support Architecture for Multichannel, Multifactor Authentication" pp. 9; Apr. 2, 2014.

Willeke, Jim; "Multiple-channel Authenitication", pp. 2, revised on Jul. 3, 2017.

U.S. Appl. No. 16/397,935 Office Action mailed Jul. 2, 2020.

U.S. Appl. No. 16/404,655 Final Office Action mailed Dec. 19, 2022.

U.S. Appl. No. 16/404,655 Office Action mailed Jul. 27, 2022.

U.S. Appl. No. 16/404,655 Final Office Action mailed Apr. 8, 2022.

U.S. Appl. No. 16/404,655 Office Action mailed Sep. 1, 2021.

U.S. Appl. No. 16/404,655 Final Office Action mailed Apr. 8, 2021.

U.S. Appl. No. 16/404,655 Office Action mailed Jan. 15, 2021.

U.S. Appl. No. 16/404,655 Office Action mailed Oct. 3, 2023.

U.S. Appl. No. 16/883,275 Final Office Action mailed Jul. 7, 2022.

U.S. Appl. No. 16/883,275 Office Action mailed Nov. 26, 2021.

U.S. Appl. No. 16/911,111 Office Action mailed Aug. 3, 2022.

U.S. Appl. No. 16/911,111 Final Office Action mailed Apr. 6, 2023.

U.S. Appl. No. 16/911,111 Office Action mailed Jul. 27, 2023.

U.S. Appl. No. 16/883,275 Notice of Allowance mailed Jan. 17, 2024.

U.S. Appl. No. 18/138,840 Office Action mailed May 16, 2024.

Crumb & Foster, "Two Factor Authentication" Version 1.0, 2018.

Misra et al., "Guide to Wireless Mesh Networks", Springer, 2009.

Wang, et al., "Preserving privacy for free: Efficient and provably secure two-factor authentication scheme with user anonymity", Information Sciences, 321:162-178, 2015.

U.S. Appl. No. 16/404,655 Office Action mailed Apr. 3, 2023.

U.S. Appl. No. 16/883,275 Office Action mailed Apr. 5, 2023.

* cited by examiner

STREAMLINED CREATION AND EXPANSION OF A WIRELESS MESH NETWORK

CROSS-REFERENCE TO RELATED APPLICATIONS

The present disclosure is a continuation and claims the priority benefit of U.S. patent application Ser. No. 16/404,655 filed May 6, 2019, now U.S. Pat. No. 12,022,295, which is a continuation in part of and claims the priority benefit of U.S. patent application Ser. No. 16/397,935 filed Apr. 29, 2019, now U.S. Pat. No. 10,972,916, the disclosures of which are incorporated herein by reference.

BACKGROUND OF THE INVENTION

Field of Invention

The present disclosure generally relates to configuring a wireless network. More specifically, the present disclosure relates to increasing the efficiency of setting up a wireless network by storing configuration information such that a wireless mesh network can be easily and securely expanded at any time.

Description of the Related Art

Every day the use of wireless networks is expanding. Furthermore, various different vendors provide redundant wireless links that allow wireless data communications to be switched between different pieces of computer hardware as needed. Communications may initially be passed via a first wireless access point and those communications may switch to being passed via a second wireless access point when the first wireless access point fails or when that first wireless access point becomes heavily loaded. In other instances, communications may be switched from the first to the second wireless access point when a mobile device is moved from one place to another. Wireless mesh networks predominantly use communications consistent with one of the 802.11 (or "Wi-Fi") wireless communication standards. Because of this, 802.11 communication channels are a preferred type of communication channel used in wireless mesh networks.

Today, a number of wireless access points or nodes in a wireless network may vary significantly. For example, a first wireless network may include two wireless access points and a second wireless network may include dozens of wireless access points. Wireless networks configured to switch communication traffic between different wireless access points are commonly referred to as wireless mesh networks, where individual access points may be referred to as mesh nodes, mesh points, or mesh portals. The ability for switching communication traffic allows hubs, routers, or switches included in conventional wired networks to be bypassed as each individual mesh node may perform functions consistent with a legacy hub, router, or switch.

Processes for setting up and configuring a wireless mesh network are often time consuming, inefficient, error prone, insecure, or are not scale-able. In certain instances, once a wireless mesh network is setup, adding additional wireless access points to that network may not be possible, in other instances adding additional wireless access points may require an administrator to manually configure new mesh nodes using tedious processes. One process for setting up wireless access points relies on initially connecting a network cable (such as an Ethernet cable) to each respective access point as each of those respective access points are configured in a serial fashion. Such a serial setup methodology does not scale well as the setting up of 10 mesh nodes takes 10 times longer than setting up a single mesh node.

A second process that may be employed to setup wireless mesh networks is to configure a fixed number of wireless access points when those access points are manufactured. Once this fixed number of access points are factory configured to securely communicate with each other, they can be installed and operate in a configuration that may not be expandable. While this second process has the advantage of easy secure installation, it suffers with scale-ability limitations. As such, this second configuration process may be appropriate for smaller mesh networks where there may be no need for the size of that mesh network to increase over time.

A third process that may be used to setup a wireless mesh network is by using non-secure wireless data communications to initially configure wireless access points. While this third process may provide the ability for a wireless mesh network to be expanded, every time a wireless access point is initially configured, data being communicated wirelessly during that configuration process may be observed or exploited by individuals with nefarious intent. This provides a window of vulnerability that exposes a network to being attacked. For example, a hacker could pretend to be a new access point or could pretend to be a device attempting to connect to the wireless network using information that was observed (snooped) by the hacker during the window of vulnerability.

In certain instances, vendors that provide mesh device rely on the use of onboarding service web portal to setup a wireless mesh network. Such instances may require that a user can login and manually input the access point device serial numbers to complete the registration process. This manual process is error-prone and requires users to spend a large amount of time collecting device information and entering that information into a web portal one by one. This is a lengthy process that is very tedious, especially when a large wireless network is configured. In other instances, other products may be installed using a batch processing solution that may help reduce manual effort to some extent, yet even such batch processing methods still require a person to enter data manually as part of the configuration process. An example of a batch process is where a user enters data into an Excel spreadsheet that is later used with a software program that accesses the spreadsheet during the network setup process. Such batch processing techniques, however still requires error-prone manual data entry and additional effort may be required to maintain the excel spreadsheet over time.

Since, current wireless access points are not designed to easily be installed, provisioned with software, or configured in a secure way, what are needed are new ways of securely installing, provisioning, and configuring wireless access points and other devices that communicate with a wireless mesh network. What are also needed are improved ways for registering and storing wireless mesh node configuration information such that new mesh nodes can be added to an existing wireless mesh network in ways that are secure, that do not require manual data entry, and that save time as compared to other methods that are commonly used to setup or configure mesh nodes in a wireless mesh network.

SUMMARY OF THE CLAIMED INVENTION

The presently claimed invention relates to a method, a non-transitory computer readable storage medium, and a system executing functions consistent with the present disclosure that streamline the creation and expansion of a wireless mesh network. A method consistent with the present disclosure may establish a secure communication session between a computing device and a computer via a first type of communication channel, may send validation information to the computing device via a second type of communication channel, and may receive the validation information from the computing via the first type of communication channel. Next a session token may be sent to the computing device when the received validation information matches the validation information sent to the computer device, registration information may then be received from the computing device that identifies mesh nodes to associate with a customer license. After the sent validation information is identified as matching the received validation information, the identified mesh nodes may be allowed to send wireless communications over a wireless mesh network associated with the customer license based on at least a portion of the received registration information being consistent with stored data.

When the presently claimed method is implemented as a non-transitory computer readable storage medium a processor may execute instructions out of a memory to perform functions consistent with the present disclosure. Here again the method may establish a secure communication session between a computing device and a computer via a first type of communication channel, may send validation information to the computing device via a second type of communication channel, and may receive the validation information from the computing via the first type of communication channel. Next a session token may be sent to the computing device when the received validation information matches the validation information sent to the computer device, registration information may then be received from the computing device that identifies mesh nodes to associate with a customer license. After the sent validation information is identified as matching the received validation information, the identified mesh nodes may be allowed to send wireless communications over a wireless mesh network associated with the customer license based on at least a portion of the received registration information being consistent with stored data.

A system consistent with the present disclosure may include a computer that establishes a communication session with a computing device via a first type of communication channel. This computer may also send validation information to the computing device via a second type of communication channel, and may receive the validation information from the computing via the first type of communication channel. Next a session token may be sent to the computing device when the received validation information matches the validation information sent to the computer device, registration information may then be received from the computing device that identifies mesh nodes to associate with a customer license. After the sent validation information is identified as matching the received validation information, the identified mesh nodes may be allowed to send wireless communications over a wireless mesh network associated with the customer license based on at least a portion of the received registration information being consistent with stored data.

DETAILED DESCRIPTION

The present disclosure relates to securely setting up mesh networks in a manner that does not require a physical network cable being attached to a wireless mesh device and that do not require transmitting unencrypted information wirelessly when a mesh network is setup. Methods and apparatus consistent with the present disclosure may allow a user to choose which mesh nodes can join a network. These methods may allow a user to specificity a custom profile that may include rules that identify how mesh network identifiers (IDs) are used, that identify passcodes/passphrases assigned to a particular network. Methods consistent with the present disclosure may also identify types of traffic that may be passed through particular 802.11 radio channels or may identify other parameters that control how traffic is switched between devices in wireless mesh network. Dual factor verification may also be used as part of a process that allows a wireless mesh network to be setup more securely.

Methods and apparatus consistent with the present disclosure may include a computer that receives registration information and that stores that registration information in a database. This registration information may be cross-referenced with a profile associated with a network configuration, with a customer license, and with an identifier that identifies a wireless mesh network. In certain instances, a customer license identifier may be the wireless mesh network identifier. Profiles consistent with the present disclosure may include configuration preferences of a wireless mesh network and may identify software components that may be installed at particular mesh nodes according to the configuration preferences. A process that registers and configures mesh node devices to be part of a wireless mesh network is referred to in the present disclosure as an onboarding process. Such an onboarding process may store registration information and configuration information in a database at a computer in the cloud or that is accessible via the Internet. This stored information may be used to easily create or expand a wireless mesh network.

Figure 1:
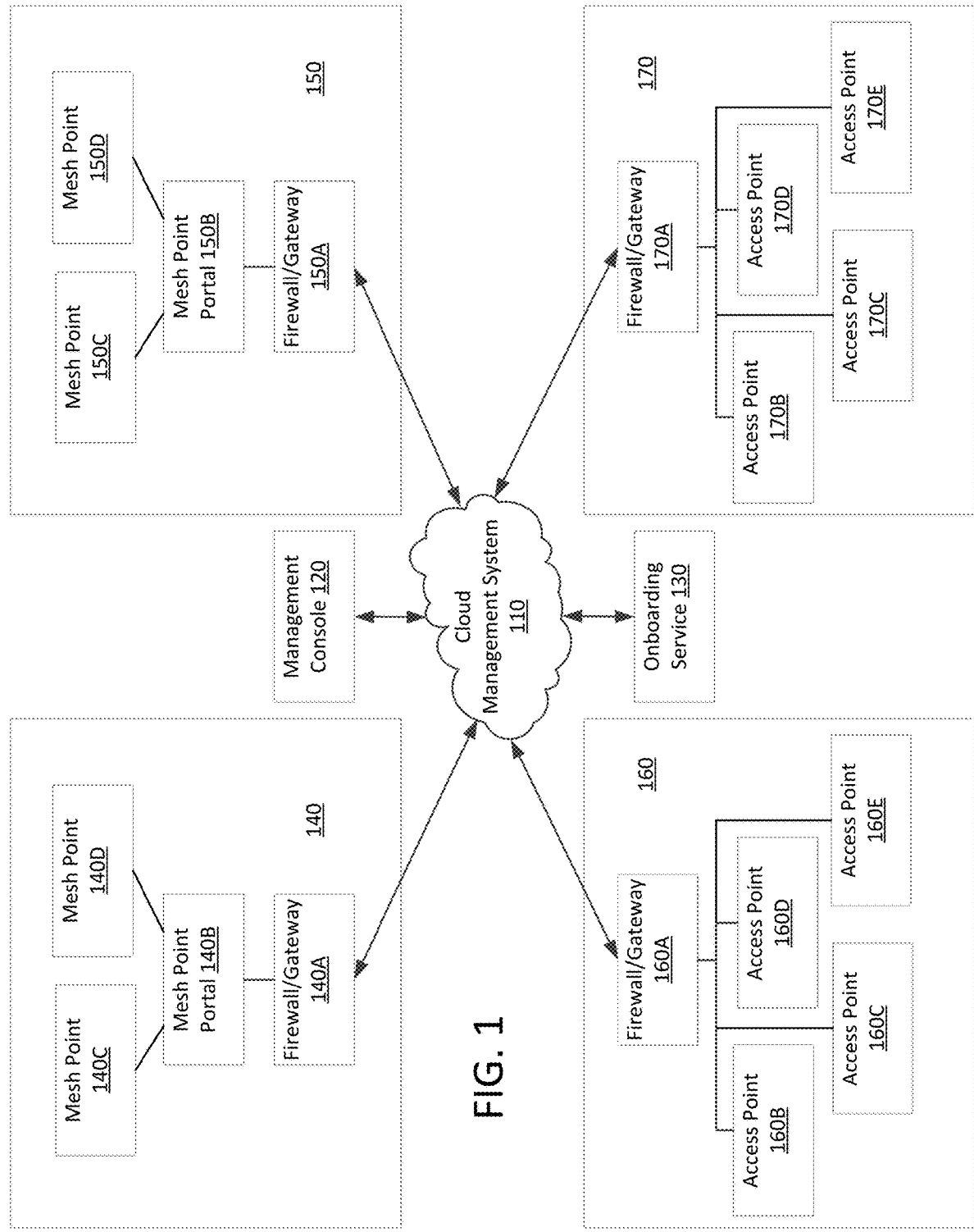
FIG. 1 illustrates a system that may be used to efficiently configure computing devices at a wireless mesh network.

FIG. 1 illustrates a system that may be used to efficiently configure computing devices at a wireless mesh network. FIG. 1 includes a management system 110 that may reside in a cloud computing environment. Management system 110 may be accessed via any type of computer network known in the art, wired or wireless. FIG. 1 includes management console 120 and onboarding service 130 that may be part of management system 110. FIG. 1 also includes various sets of networked computing devices 140, 150, 160, and 170. A first set of networked computing device 140 includes firewall/ gateway 140A, mesh portal 140B, and mesh points 140C & 140D. A second set of networked computing device 150 includes firewall/gateway 150A, mesh portal 150B, and mesh points 150C & 150D. A third set of networked computing device 160 includes firewall/gateway 160A and access points 160B, 160C, 160D & 160E (160B-160E). A fourth set of networked computing device 170 includes firewall/gateway 170A and access points 170B, 170C, 170D & 170E (170B-170E).

In certain instances, mesh portals consistent with the present disclosure may wirelessly communicate with a plurality of wireless mesh points and may communicate over a wired network. As such, a mesh portal may act as a gateway between wireless mesh points and a wired local area network. In such instances, a mesh portal may broadcast transmissions that include a mesh identifier (MSSID) and a cluster name that advertise the wireless network to mesh points that are configured to operate as members of a particular wireless mesh network. In other instances, a mesh point may include a cellular (e.g. 3G, 4G, LTE, or 5G) link or more than one mesh node in a mesh network may be configured to operate as a redundant mesh point that uses a wired or a wireless network connection.

The terms "access point" or "wireless access point" in the present disclosure refer to a device that may be wirelessly communicatively coupled to a computer directly with or without wireless communications passing through another wireless device. As such, the terms "access point" or "wireless access point" may refer to either a mesh portal or mesh point. The term mesh portal may relate to a wireless device that performs functions that a mesh point need not perform. Both mesh portals and mesh points may perform functions consistent with a wireless access point because both mesh portals and mesh points may act as a wireless access point that directly wirelessly communicates with a computer. The terms mesh node in the present disclosure may be used to refer to either a mesh portal or a mesh point that uses wireless communications to transmit and receive wireless computer network messages and data.

Typically the terms "firewall" or "gateway" in the present disclosure may refer to computing devices that communicate over wired network connections. In certain instances, however, a mesh node may include functionality consistent with a firewall or gateway. In certain instances, functions conventionally associated with a firewall or gateway may be performed by a mesh portal or by mesh point. In these instances, a mesh portal or a mesh point may perform functions consistent with evaluating content ratings, deep packet inspection, or may include anti-virus program code.

A mesh portal may be configured to transmit and receive data network communication traffic between two different types of computer network, for example, between a network that communicates over wires and a network that uses wireless 802.11 signals. Alternatively or additionally, a mesh portal may transmit and receive data network communication traffic between a cellular network and an 802.11 network. Mesh points, however, may be limited to receiving and transmitting network traffic wirelessly over a single type of network, for example, over an 802.11 network. While mesh portals include different functionality as compared to a mesh point, certain mesh points may be configured to assume the role of a mesh portal.

Once configured, mesh points consistent with the present disclosure may communicate using wireless 802.11 communications only, or some of these mesh points may be configurable to be promoted to assume the functionality of a wireless mesh portal. While communications in a mesh network may be sent through any number of mesh points until those communications reach a mesh portal, most mesh points may typically be located within three hops of a mesh portal. Furthermore, a number of mesh portals that communicate with a mesh point may be limited by a rule or setting. For example, a rule may limit a number of mesh portals connected to a particular mesh portal to eight or another rule may limit a number of hops to three.

The mesh point portals (140B & 150B), mesh points (140 C/D & 150 C/D) of FIG. 1 may be wireless mesh nodes that allow mobile devices or other computers to connect to networks 140 or 150 redundantly. For example, a user device may initially connect to network 140 using mesh point 140C after which communications may be sent to mesh point 140D. In an instance when mesh point 140C is unreliable, fails, is overloaded, or when a signal strength of mesh point 140C is weaker than the signal strength of mesh point 140D, communication traffic may be switched from mesh point 140C to mesh point 140D. In certain instances, the mesh points illustrated in FIG. 1 may include similar functionality as functionality performed by a mesh portal. Mesh point portals may include additional functionality that may not be provided by a mesh point in a given network. For example, mesh point portal 140B may be able to send transmissions over a wired network to firewall/gateway 140A. Alternatively or additionally, mesh point portals may be configured to communicate with other computing devices wirelessly. In such instances, mesh point portal 140A may communicate with cloud management system or with other devices via a cellular network, while mesh point portal communicates with other devices (such as user devices, mesh point 140C, or mesh point 140D) using standard 802.11 wireless communications. Computing devices associated with networks 160 or 170 include firewall/gateway (160A & 170A) and various access points (160B-160E & 170B-170E). In certain instances, each of these different access points may include wireless communication capabilities like the mesh points 140C/140D and mesh portal 140B of network 140, for example.

Computing devices connecting to a particular mesh network and mesh nodes (mesh points or mesh portals) may be setup and configured using methods that increase security by using shared secrets or that use privileged communication pathways. These shared secrets or privileged communication pathways may be difficult or impossible to observe (snoop) or hack. For example, a particular computing device may be configured to communicate with cloud management system 110 of FIG. 1 via a secure tunnel during a configuration process that also uses a different communication technique to share information between a mesh point and a user device. In such an instance, this different communication technique may include sending information between the mesh point and the user device via a short distance/low power communication connection, such as a Bluetooth® or Bluetooth® light communication connection. Data transmitted via this low power communication connection could be difficult to snoop or hack in instances when a hacker is physically located out of range of a low power data communication signal.

Processes for configuring and setting up devices in a wireless mesh network may also include two factor authentications, where secret information is sent to a user device.

For example, a message that includes secret information may be sent to an email address or may be sent in the form of a text message to the user device. This secret information may then be used to secretly validate or identify that the computing device can be allowed to communicate with devices at a wireless mesh network. For example, a user device may provide a secret code that was received via a text message from a computer located at the cloud or Internet to a wireless access point. This secret information may be provided to a user device via a type of communication channel that is different from a type of communication channel that communicates other information. For example, one communication channel type may be a cellular communication channels and another type of communication channel may be a wireless 802.11 channel.

Once validated, a user device may be able to connect to a particular mesh network from anywhere. For example, a configuration at a validated user device may allow that user device to connect to the mesh network via a cellular connection when that user device is located at a location far from an 802.11 mesh network. In such an instance, the user device may communicate with other devices that are located within a zone, where these other devices may communicate via the mesh network using communications consistent with an 801.22 WI-FI communication channel.

When a mesh network is configured, communications may pass from one or more mesh nodes (mesh point or mesh portals) as those mesh nodes are provisioned with software or configured using onboarding service 130 of FIG. 1. Management consoles 120 may be used to organize and store data associated with particular mesh networks in a database. Data stored in such a database may cross-reference customer identifying information with machine (MAC) addresses/identifiers that identify mesh node devices that have been configured to operate in that particular customer's wireless mesh network. Data stored in this database may also cross-reference MAC addresses or other information that identifies computing devices that are authorized to connect to a particular customer's wireless mesh network. In certain instances, MAC addresses or other identifying information stored in the database may be copied to memories resident within a particular mesh network. After sets of configuration information are stored, additional mesh nodes may be added to the mesh network in a manner that requires little or no user intervention. For example, a user device may scan a label, a bar code, a quick response (QR) code, or a near field data communication (NFC) tag/chip that identifies the new mesh node component. Once that new mesh node component has been identified and cross-referenced to a particular customer account, that new component may be provisioned with software and configured automatically. Here again, low power data communications may allow an authorized user device to securely configure a single or a group of wireless access points. Methods and systems consistent with the present disclosure provide a capability that allows all communications of a wireless mesh network to be secure, even when networks are initially configured or when new wireless access points are added to a wireless mesh network.

Whenever mesh nodes in a mesh network are powered on (boot up) they may communicate with each other when identifying best pathways that can be used to pass network communications. In certain instances, different frequencies may be used to transmit 802.11 communications and these frequencies may be configured by one or more rules that direct certain types of communication traffic to a particular radio frequency. For example, communications that use 5 gigahertz (GHz) signals may be used to transfer network associated data and client traffic and communications that use 2.4 GHz signals may be used only for client data. Furthermore, each mesh node (mesh point or mesh portal) may be configured and provisioned according to a consistent profile according to one or more rules. Profiles for a certain mesh network may be stored in a memory associated with a user mobile device that participates in the registration and configuration of wireless mesh nodes or may be stored in a database at a server that administrates a registration or onboarding process.

Figure 2:
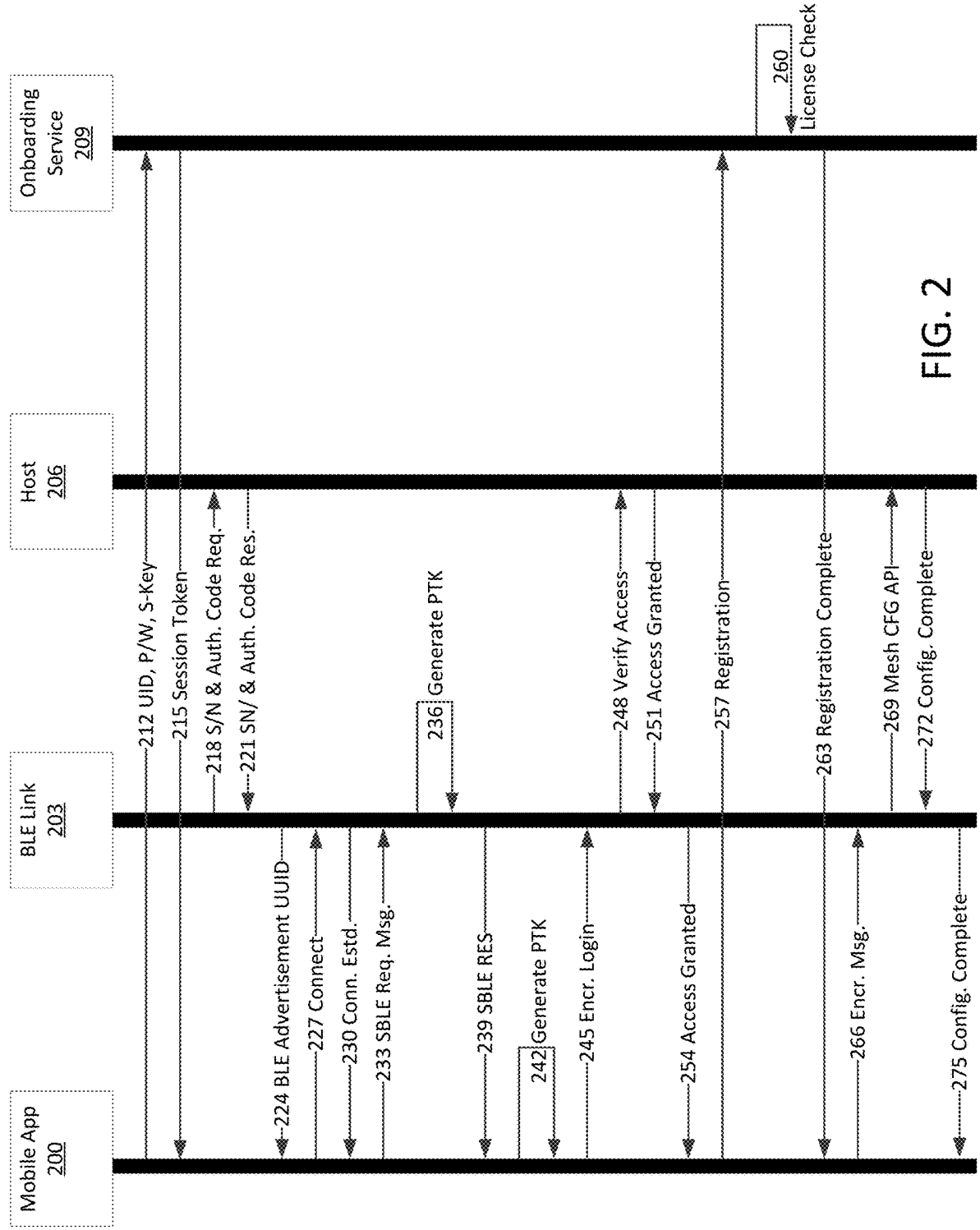
FIG. 2 illustrates communications that may be performed when a computing device is registered and configured to communicate with a mesh network.

FIG. 2 illustrates communications that may be performed when a computing device is registered and configured to communicate with a mesh network. FIG. 2 includes actions performed by a mobile device that may communicate with a host computer 206 via a short distance wireless link (such as a Bluetooth® or low power Bluetooth® communication link) 203. At least a portion of a process that registers mobile app 200 may be performed via operation of program code on onboarding service 209. Program code instructions associated with onboarding service 209 may be executed by a processor at a cloud computing device and program code residing at the mobile device may include instructions associated with mobile app 200.

Initially, program code of mobile APP 200 may prepare a message 212 to send to an onboarding service in the cloud. This communication may be passed by any communication medium known in the art, yet for convenience or in certain instances, message 212 may be sent via a wireless cellular communication link. Message 212 will typically be sent via a secure communication protocol, such as the secure hypertext transfer protocol (HTTPS). By using a secure communication protocol, information may be securely provided to a cloud computer that executes program code consistent with onboarding service 209. In certain instances, message 212 may be passed through host 206. Alternatively, message 212 may be passed directly to the computer executing the instructions of onboarding service 209, without passing through host 206. Message 212 may include a user identifier (UID), a password, and a security key. After the login information has been sent to onboarding service 209, the computer executing the onboarding service 209 program code may include instructions that cause a unique session token to be sent to a mobile device executing instructions associated with mobile APP 200. Message 212 may be part of a process where a secure communication session is established between a computer executing onboarding service 209 and a mobile device executing program code of mobile application 200. Program code associated with onboarding service 209 may also use a two-factor authentication process to validate a user device before issuing a session token. For example, a cloud computing device may send a text message, email, or voice message that includes a code that must be provided to the cloud computer before a session token is sent to a mobile device in communication 215 of FIG. 2.

In certain instances, BLE link 203 may be coupled to a first processor at a wireless access point that communicates with a second processor at host 206. Because of this the first processor at the wireless access point may perform tasks associated with messages or processes 218, 221, 224, 227, 230, 233, 236, 239, 245, 248, 251, 266, 269, 272, and 275 and the second processor at the wireless access point may perform tasks associated with messages or processes 218, 221, 248, 251, 269, and 272. In other instances, other low power data communication technologies may be used in when a wireless mesh network is setup. For example, a proprietary wireless communication technique may be used or a high bandwidth short distance millimeter radio wave transducers (such as transducers made by Keyssa (e.g. the "Keyssa Kiss") or optical data transmitters/receivers/transceivers may be used.

A person configuring their wireless mesh network may then use their mobile device to scan a barcode, a quick response (QR) code, or a near field data communication (NFC) tag to obtain information associated with host 206. After the mobile user device has scanned code or tag, authentication information may be sent via short distance wireless link 203 to host 206 in communication 218 of FIG. 2 and then a response to that authentication request may be received in communication 221 of FIG. 2. Authentication request 218 may include a serial number of host computer 206 and may include an authentication or authorization code.

Authentication request 218 may be sent by circuitry, a chip, or a processor that communicates with a mobile device using Bluetooth® communications (BLE) link 203 and that communicates with a processor of host computer 206. Communication 221 is a response message that may pass the serial number of host computer 206 and the authentication code from the processor of host 206 back to the circuitry, the chip, or the processor of BLE link 203. Since communications sent via wireless link 203 are low power wireless signals, only devices within a particular distance of host 206 would be able to receive information sent via low power wireless link 203. As such, the use of low power wireless link 203 allows devices to initiate a relatively secure registration process using communications that have a very limited range.

Host computer 206 may then broadcast advertisement messages 224 to devices within range of the low power link 203. This advertisement may be in a format consistent with a low power Bluetooth® advertisement that may include an encoded universal unit identifier (UUID) and this encrypted UUID may include an authorization code, a system status, and a serial number, for example. The authorization code of message 224 may be the same authorization code associated with communications 218 and 221. The mobile APP 200 at a mobile device may then compose a connect message 227 that is sent to host computer 203 via link 203, and a Bluetooth® connection message 230 may then be sent to the mobile device when a secure low power/Bluetooth® communication session is established between the host 206 and the mobile device. After the low power communication session has been established, mobile APP 200 may then generate request message 233 to send to the host 206 of FIG. 2. This request message may include a first random/pseudo random number (or first nonce). Next, a process at the host 206 may generate a second random/pseudo random number (or second nonce) and may generate a pairwise temporary key (PTK) during process 236 of FIG. 2. This temporary key may have been generated using the first nonce, the second nonce, a machine (MAC) address of the mobile device, a MAC address of host 206, a serial number, or other information. This temporary key may also be created using a hash of information. The MAC address of the mobile device may have been provided to host 206 in connect message 227 of FIG. 2.

Host 206 may then generate message 239 that includes a machine integrity code (MIC) and the second nonce. After message 239 is generated, it may be sent to the mobile device. Next, mobile APP 200 may then extract the MIC and the second nonce from message 239 and then a processor at the mobile device may generate the pairwise temporary key using information that may include the first nonce, the second nonce, the mobile device MAC, the host MAC, the serial number, the authentication code, or other information in process 242 of FIG. 2. The processor at the mobile device may then compute its own version of the MIC and compare that re-computed MIC with the MIC included in message 239 when verifying the pairwise temporary key during process 242 of FIG. 2. The processor at the mobile device may then encrypt a login message that is sent to host 206 over link 203. This encrypted login message may include a user name, a password, and an authentication code. Host 206 may then verify this login information during process 248 of FIG. 2, host 206 may then prepare an access granted message during process 251 that is sent to the mobile device as access granted message 254 of FIG. 2. Next, the mobile device may then send registration message 257 to the cloud computer that executes instructions consistent with onboarding service 209. Here again message 257 may be sent over the secure tunnel to the cloud computer. Registration message 257 may include a user identifier (UID), the session token from message 215, a serial number, and an authentication code. Registration message 257 may also include settings set by a user accessing mobile APP 200 at a mobile or other computing device.

The cloud computer executing the instructions consistent with onboarding service 209 may then validate the mobile device during process 260 that may check that the user device is associated with a valid license or valid customer account. Step 260 may also validate information associated with a mesh node that includes BLE link 203 and host 206. This validation information may include a serial number of a mesh node device and an authorization code associated with the mesh node device. This validation process may include accessing a database that stores information that cross-references mesh node serial numbers with authorization codes. When a particular mesh node device is manufactured, it may be assigned a serial number and an authorization code and this information may have been stored in the database as part of a manufacturing process associated with building or packaging a mesh node device. This information may also include a model number and/or a revision number and either of these model or revision numbers may be used to identify the capabilities of a particular mesh node device.

For example, a mesh node device may be assigned a serial number of A1234ADAD221 and an authorization code of Zebra221 and this mesh node device may have been built as a model A1000Z, and mesh node devices with model A1000Z may identify a processor type or an amount of non-volatile memory built within that mesh node device. Model number information may also be used to identify whether a particular mesh node device can be used as a mesh portal, a mesh point, or both. Mesh node serial number 1234ADAD221 may be a unique number assigned to only one single mesh node device. The validation process may access the database to retrieve an authorization code associated with serial number 1234ADAD221 and the retrieved authorization code Zebra221 may be compared with information received in registration message 257 of FIG. 2. When this comparison identifies that a serial number and an authorization code included in registration message 257 matches the serial number and authorization code stored in the database, a particular mesh node may be validated as being an authentic mesh node. Information associated with a mobile device that sent registration message 257 may also be included in registration message 257 and this information may be used to associate that mobile device with the mesh node. In certain instances, this information associated with the mobile device may be used to register that mobile device with onboarding service 209 automatically after mesh node serial number and authentication codes have been authenticate.

Alternatively, the information associated with the mobile device may be a unique number such as a serial number or MAC of the mobile device or this information may have been assigned as part of an additional registration process that associates the mobile device with a particular customer or customer license. When an additional authentication process is used to register a particular mobile device may include the mobile device downloading mobile application 200 and may include the mobile device sending information that identifies a customer (e.g. using a customer identifier or number) that the mobile device may be associated with a wireless mesh network. Information that identifies the mobile device and the customer may also be stored in the database. In such instances, license check process 260 may include associating the mesh node identified by the serial number and authentication code included in registration message 257 with the customer. As such information stored in the database may cross-reference a mobile device, with a customer identifier, with a mesh node, and with a mesh network owned by the customer identified by the customer identifier.

In certain instances, the cloud computer may store information that associates host 206 and the user device serial number (or MAC address/identifier) with a particular wireless mesh network and with a particular customer. After the mobile device, the mesh node, or both are authenticated, onboarding service 209 may then prepare a message to send to the mobile device and the cloud computer may then send a registration complete message 263 to the mobile device. After receiving the registration complete message, the mobile application 200 at the mobile device may then send an encrypted message 266 via wireless link 203. This encrypted message may include an encrypted version of the pairwise temporary key that was calculated during process 242 of FIG. 2. After encrypted message 266 is sent, that message may be decrypted according to an encryption standard using the pairwise temporary key generated at host 206 during process 236 of FIG. 2. This decryption may be performed during process 269 of FIG. 2. This decryption may be performed using an application program interface (API) call that may be referred to as a mesh configuration API call. Process 269 may also include setting a configuration after which process 272 may compose a configuration complete message 275 to send to the mobile device.

After completing this configuration process, the mobile device executing program code consistent with mobile APP 200 may securely communicate with computing devices at the Internet via one or more different mesh nodes devices included in the newly configured mesh network. Host 206 may be a mesh point or a mesh point portal like those illustrated in FIG. 1. Operation of mobile APP 200 may allow a mobile device to find and identify all compatible mesh points or mesh portals that are associated with a mesh network. In certain instances program code of mobile APP 200 may allow a mobile device to communicate with compatible mesh nodes (mesh points or portals) when multiple mesh nodes are registered, provisioned with software, or configured simultaneously.

Methods and apparatus consistent with the present disclosure may allow a user to choose which mesh nodes can join a network and that user may specificity a custom profile that may include rules that may identify how mesh network identifiers (IDs) are used or that identify passcodes/passphrases assigned to a particular network. These methods may identify types of traffic that may be passed through particular 802.11 radio channels, or other parameters that may control how traffic is switched between devices in a particular wireless mesh network. This combined with dual factor verification and the use of low power wireless communication channels make methods and apparatus consistent with the present disclosure easy to deploy and expand according to the wishes of users that are responsible for establishing and maintaining specific wireless mesh networks. In certain instances, mesh IDs and passcodes/passphrases may be based on a timestamp or equipment identifiers that insure that a mesh ID or other information are unique. Methods consistent with the present disclosure may receive settings or profile information via operation of a program application, like mobile APP 200 of FIG. 2, for example. Alternatively, profile information may be received from onboarding service 209 when a wireless mesh node is added to an existing wireless mesh network for which profile information already exists. In such instances, information that cross-references customer information with a particular network profile may be accessed by onboarding service 209 when a new wireless mesh node is added to the existing wireless mesh network.

Figure 3:
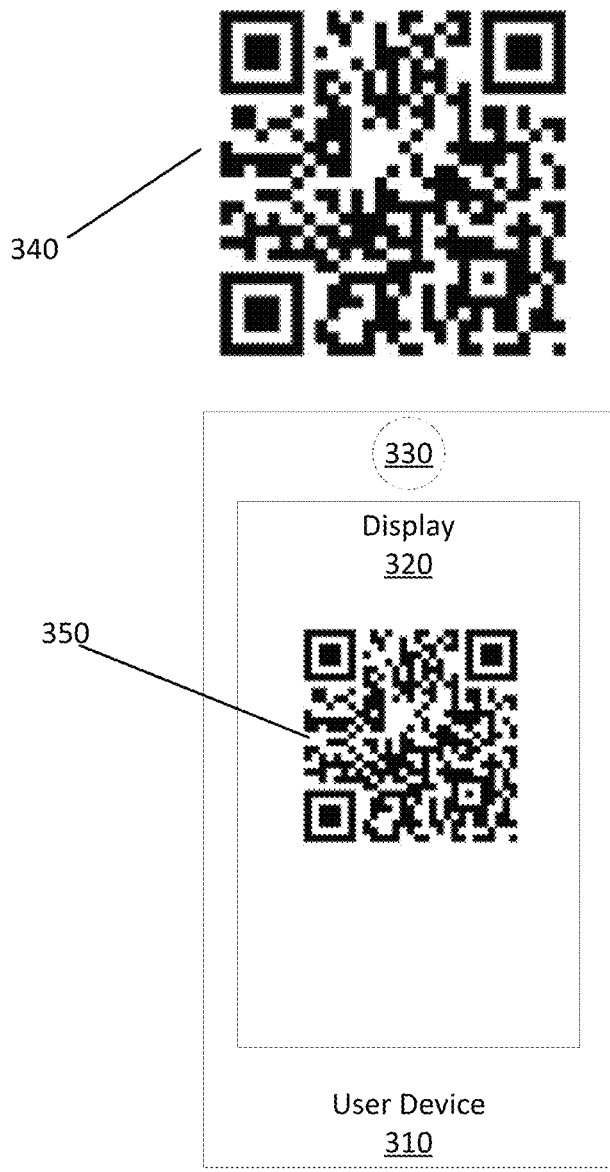
FIG. 3 illustrates a user device that acquires an image of a Quick Response (QR) code when configuring a wireless mesh network.

FIG. 3 illustrates a user device that acquires an image of a Quick Response (QR) code when configuring a wireless mesh network. FIG. 3 includes user device 310 that acquires an image of QR code 340 using camera/sensor 330 at user device 310. User device 310 also includes display 320 that displays an image 350 of QR code 340 after that image has been acquired. The QR code 340 illustrated in FIG. 3 may be a code imprinted on enclosure of a wireless access point (mesh node) or QR code 340 may be imprinted on a box that contained the wireless access point (mesh node).

Once the code is acquired, user device 310 may communicate with the wireless access point when a wireless mesh network is setup, provisioned, or configured. A program application executing at user device 310 may allow user device 310 to identify a serial number and authentication code associated with the wireless access point when sending communications to that wireless access point as illustrated in communications 218, 221, 224, 227, 230, and 233 of FIG. 2. Here again, these communications may use a low power communication interface that can only transmit signals within a limited range. As such, user device 330 may acquire an image of QR code 350 by scanner/camera 330 that may result in image 350 being acquired by user device 310 and displayed in display 320 of user device 310. Once this image data is processed by user device 310, user device 310 may perform steps consistent with FIG. 2 when setting up a wireless mesh network. In certain instances, information transmitted by another type of wireless communication interface may be used to send information directly from user device 310 or via the wireless access point when registration details are sent to a computer in the cloud or Internet. These registration details may be used to associate a customer identifier with devices in a configured wireless mesh network. Furthermore, these registration details may be used to identify that user device 310 is authorized to access the wireless mesh network of that customer, even when user device 310 previously did not communicate with particular devices of a wireless mesh network.

For example, user device 310 may have been used to configure mesh nodes at an office in San Francisco that is associated with customer A. In an instance, where a user of user device 310 travels to an office of customer A in Los Angeles, user device 310 may be identified as being authorized to access the wireless 802.11 network of customer A at their Los Angeles office. Alternatively or additionally, user device 310 could access other devices at the wireless mesh network via a cellular communication interface, when user device 310 was located away from either the San Francisco or the Los Angeles office of customer A.

During installation of a new wireless mesh network or when expanding a wireless mesh network, all nearby compatible wireless mesh devices may be identified along with respective capabilities of each respective wireless mesh device. In certain instances, a user may be able to select from a list of mesh devices identified using low power data communications when the mesh network is setup or expanded and each of the selected mesh devices may be configured according to a profile in a parallel rather than in a serial manner. The scanning capability illustrated in respect to FIG. 3 may be used to identify mesh devices that should be configured as part of a mesh network. A user may also select a size of the mesh network and may set a topology of a mesh network. For example, particular mesh points may be initially configured to communicate with certain other specific mesh points, where each mesh node may be placed in a hierarchy that specifies at least initial settings relating to which mesh point is located how many hops from a particular mesh portal. These mesh points may also be configured to switch configurations based on other settings or parameters by using a program application, such a mobile APP 200 of FIG. 2. In instances where a user does enter settings related to the configuration of a wireless mesh network, that user may not be required to manually enter device information, such as device serial numbers or machine identifiers because all a user may have to do is to scan a quick response (QR) code to identify a wireless device that will be included in a wireless mesh network.

In other instances, the onboarding of wireless devices in a wireless mesh network may include the registration of computing devices automatically with little or no user intervention. In such instances a user may not be required to manually enter device information as here again a user may simply scan a QR code that identifies a wireless mesh device. This QR code may also include an authorization code and other information that may be used during a registration or onboarding process. Registration or onboarding processes consistent with the present disclosure may include the storing of information that identifies a mesh portal, one or more mesh points, and wireless computing devices associated with a new wireless mesh network. Part of this onboarding process may include a sever updating configurations at one or mesh devices according to a profile stored in memory.

Figure 4:
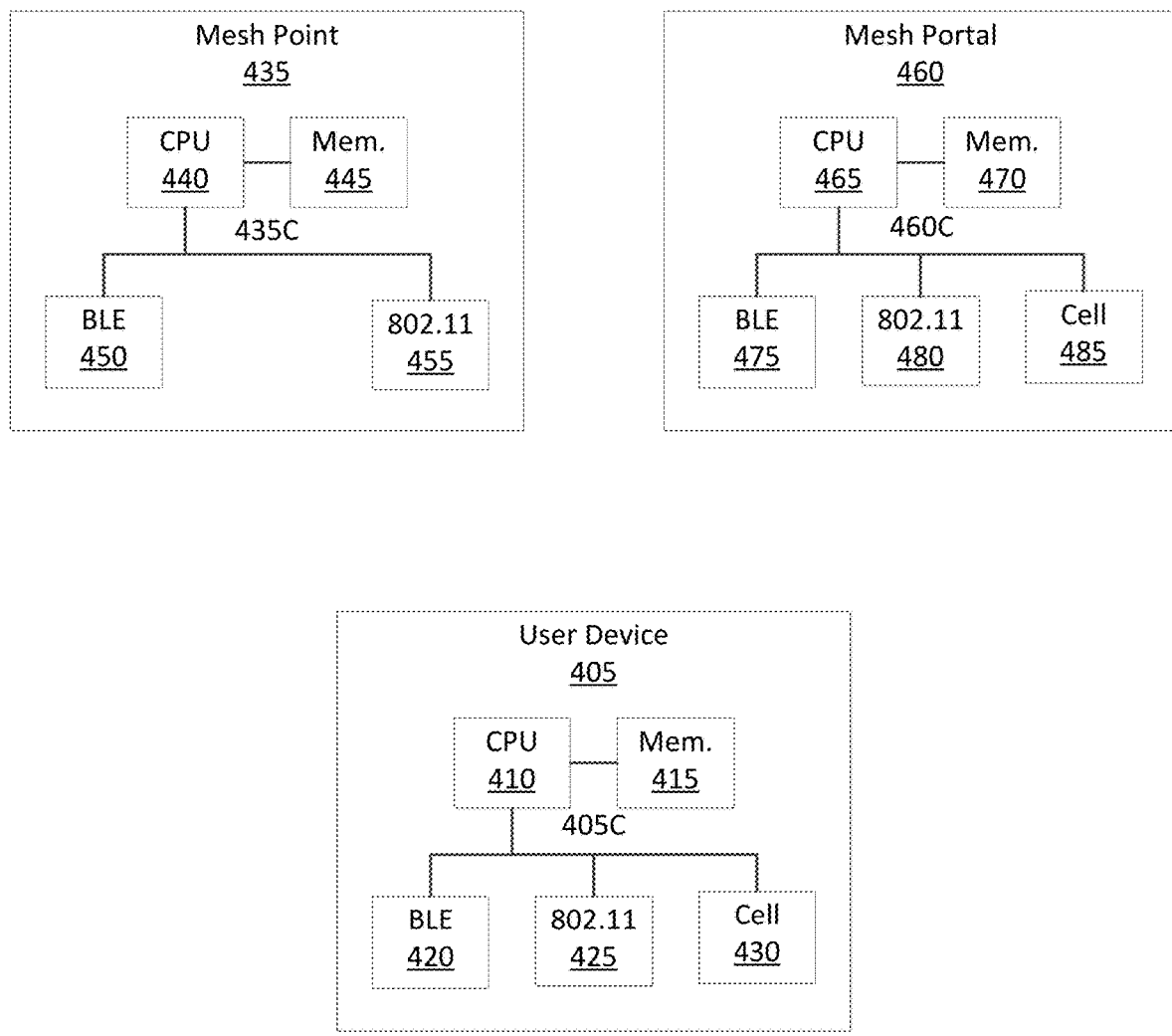
FIG. 4 illustrates different computing devices that may be configured to send communications with each other according to rules or policies consistent with the present disclosure when a wireless mesh network is setup.

FIG. 4 illustrates different computing devices that may be configured to send communications with each other according to rules or policies consistent with the present disclosure when a wireless mesh network is setup. FIG. 4 includes user device 405, mesh point 435, and mesh portal 460. User device 405 includes a processor/central processing unit (CPU) 410 that may execute instructions out of memory 415. User device 405 also includes communication interfaces of low power Bluetooth® light interface 420, Wi-Fi® 802.11 interface 425, and cellular interface 430. Items 405C included in user device 405 are electrical connections that CPU 410 may use to access memory 415 or that CPU 405 may use to communicate with Bluetooth® light interface 420, Wi-Fi® 802.11 interface 425, and cellular interface 430. Communication connections 405C may include direct electrical connections that form a communication bus. User device 405 may be the same mobile device that executes instructions consistent with functions associated with mobile app 200 of FIG. 2. As such, user device 405 may communicate with low power data communication links (475/450) at mesh portal 435 or mesh portal 460 using BLE links 203 of FIG. 2.

The mesh point 435 of FIG. 4 includes processor/CPU 440 that may execute instructions out of memory 445. Mesh point 435 also includes Bluetooth® light interface 450 and Wi-Fi® 801.22 interface 455. Items 435C are communication connections that CPU 440 may use to access memory 445 or that CPU 445 may use to communicate with low power Bluetooth® light interface 450, and Wi-Fi® 802.11 interface 455. Communication connections 435C may include direct electrical connections that form a communication bus. Mesh point 435 may implement functions consistent with the various mesh points (140C, 140D, 150C, or 150D) discussed in respect to FIG. 1. Furthermore, the low power communication link 450 at mesh point 435 may communicate in a manner consistent with the BLE link 203 of FIG. 2.

Mesh portal 460 includes processor/CPU 465 that may execute instructions out of memory 470. Mesh portal 460 also includes communication interfaces of low power Bluetooth® light interface 475, Wi-Fi® 802.11 interface 480, and cellular interface 485. Note that mesh portal 460 includes cellular communication interface 485, where mesh point 435 does not include a cellular communication interface. Items 460 are communication connections 460C that CPU 465 may use to access memory 470 or that CPU 465 may use to communicate with low power Bluetooth® light interface 475, Wi-Fi® 802.11 interface 480, and cellular interface 485. Communication connections 460C may include direct electrical connections that form a communication bus. Mesh portal 460 may implement functions consistent with the various mesh portals (140BC or 150B) discussed in respect to FIG. 1. Furthermore, the low power communication link 475 at mesh point 460 may communicate in a manner consistent with the BLE link 203 of FIG. 2.

Note that mesh portals and mesh points may include different capabilities as mesh portals may include functionality that allows the mesh portal to send network communications over cellular communication interface 485, where mesh point 435 may not include this functionality. In certain instances, mesh portals may include wired network interfaces that allow a mesh portal, like mesh portal 460 to send network communications over a wired computer network, where mesh point 435 may not include such functionality.

Alternatively, mesh point 435 may include a cellular communication interface or a wired that is disabled based on a mesh point configuration that is different from a mesh portal configuration. In certain instances, user device 405 may communicate with both mesh point 435 and with mesh portal 460 using a low power signals that have a limited range. For example, Bluetooth® light interface 420 at mobile device 405 may communicate with mesh point 435 using Bluetooth® light interface 450 and may communication with mesh point 460 via Bluetooth® light interface 475 during a registration process. User device 405 may also communicate with mesh point 435 using 802.11 interface 425 at user device 405 and 802.11 interface 455 at mesh point 435. Alternatively or additionally, user device 405 may also communicate with mesh portal 460 using 802.11 interface 425 at user device 405 and 802.11 interface 480 at mesh portal 460.

In an instance where mesh point 435 fails when user device 405 is communicating with mesh point 435 over using communications consistent with the 802.11 specification, communications could "fail over" (switch) to mesh portal 460 or another mesh point (not illustrated in FIG. 4). Such a "fail over" process could include user device 405 forming a communication connection with either mesh portal 460 or with the other mesh point. Communications sent to a computer through a first mesh point may be switched to a second mesh point according to a set of rules that identify conditions when such communications should be switched. For example, a rule may identify that communications be switched to another mesh point when communications with a currently used mesh point is experiencing an error rate that meets or exceeds a threshold level. Alternatively or additionally, switching rules may identify that a communication connection should be switched when a collision rate increases, when a particular mesh point has a greater than a threshold level measure of congestion, or such rules may dictate that a particular connection should be switched when another mesh node has a greater signal strength. In one example, a reduction in signal strength in communications associated with mesh point 435 may cause a communication connection to switch to another mesh point when that other mesh point has a stronger signal than mesh point 435. Exemplary measures of congestion include, yet are not limited to an amount of time or average time required to send or receive communication packets, a number of devices connected to a particular mesh point, a number of communications or bytes being transmitted per unit time via particular mesh nodes, or a number of hops to a mesh portal. This number of hops may be associated with a number of mesh points through which a data packet passes until that data packet reaches a mesh portal. The switching capability included in wireless mesh networks consistent with the present disclosure allows either indoor or outdoor wireless networks to self-heal in a manner that is redundant, robust, and secure. This switching capability also allows traffic in a wireless mesh network to be re-configured according to any rules or policies as requirements change over time.

In certain instances, methods and systems consistent with the present disclosure may include promoting a mesh point to assume functions of a mesh portal. This may occur when a particular mesh portal fails, when a greater than a threshold error rate is encountered, when an increased collision rate associated is observed, or when a measure of congestion associated with a mesh portal reaches a threshold level. The promotion of a mesh point to a mesh portal may include enabling functionality at a particular mesh point. For example, in an instance when mesh point 435 is promoted, a cellular communication interface at mesh point 435 may be turned on (enabled) such that mesh point 435 could assume duties previously performed by mesh portal 460.

Figure 5:
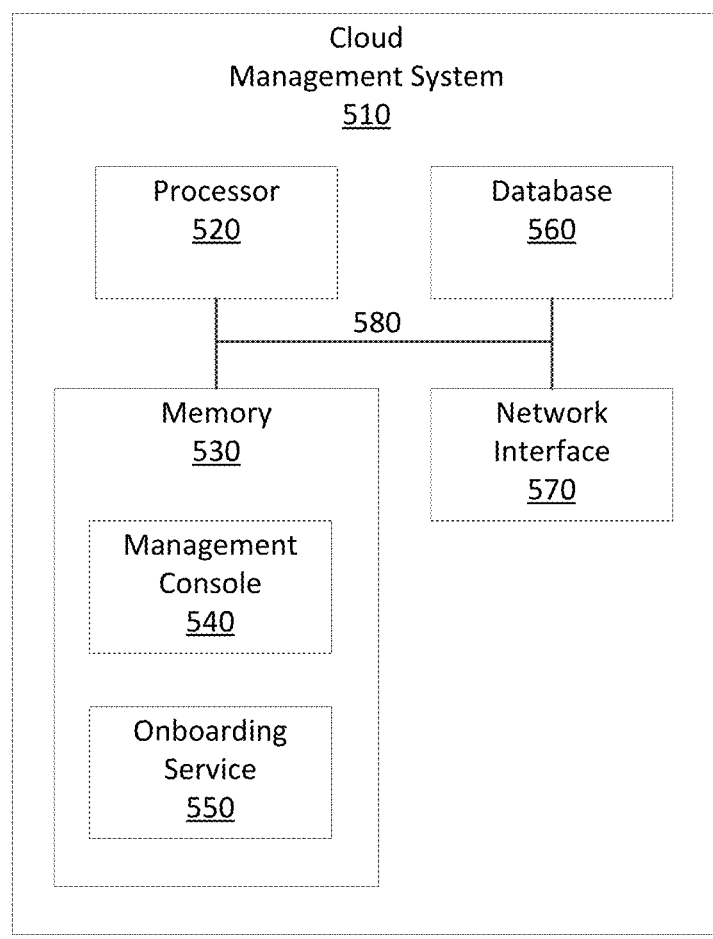
FIG. 5 illustrates components that may be included in a management system residing in the cloud or Internet that may provide information necessary to setup a wireless mesh network.

FIG. 5 illustrates components that may be included in a management system residing in the cloud or Internet that may provide information necessary to setup a wireless mesh network. The cloud management system 510 of FIG. 5 may implement functions consistent with the cloud management system 110 of FIG. 1 and may implement functions consistent with onboarding service 209 of FIG. 2. The cloud management system 510 of FIG. 5 includes processor 520 that may execute instructions out of memory 530. Memory 530 may also store program code associated with management console 540 operations or with functions associated with onboarding service 550. Management console program code 540 may allow processor 520 to receive and process information from a computer that sets network configurations or that sets network management rules. Program code of onboarding service 550 may allow information relating to a network configuration to be stored in database 560 that cross-references customer information with mesh node device identifying information, and with identifiers that identify computing devices that are authorized to communicate over a particular mesh network.

Cloud management system 510 of FIG. 5 may also include communication bus 580 that allows processor 520 to access data or instructions stored in memory 530 or in database 560. Instructions stored in database 560 may also include program code that may be executed at a mesh portal or mesh point that is consistent with methods and wireless mesh network configurations of the present disclosure. Management console program code 540 may also administrators to set policies or preferences relating to a particular mesh network. Management console 540 may also allow an administrator or user to identify, configure, and authorize new computing devices to access a particular mesh network. Note that processor 520 may also use communication bus 580 to send or receive data via communication interface 570. Network interface 570 may be either a communication interface that communicates with user devices using either wired or a wireless data communications. Here again, wired network communications may be sent over an Ethernet compatible wired interface or these communications may be send over a cellular network.

Processor 520 may execute instructions out of memory 530 when operations consistent with management console 540 are performed, when information is stored in database 560, when operations consistent with onboarding service 550 are performed, or when communications are transmitted/received via network interface 570. Operations consistent with onboarding service 550 may include the same sorts of operations discussed in respect to onboarding service 209 of FIG. 2. For example, onboarding service 550 may use/receive login or device information over a secure channel (e.g. HTTPS), may use/provide unique session keys, and may perform device/mesh node registration & license checks consistent with operations associated with communications 218, 221, 257, 260, and 263 of FIG. 2.

Figure 6:
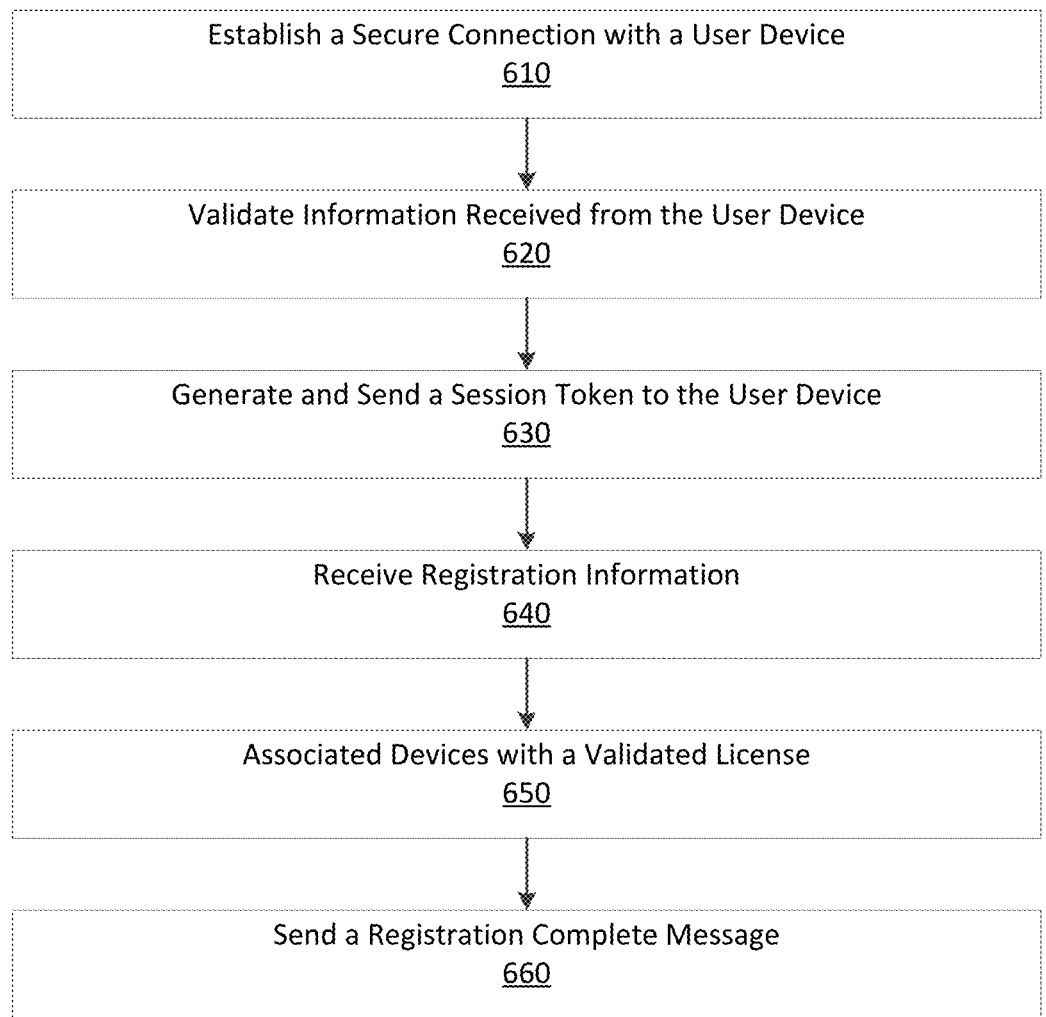
FIG. 6 illustrates exemplary steps that may be performed by a processor executing instructions out of a memory when a user device is validated and when registration information regarding a wireless mesh network is received at a cloud management system.

FIG. 6 illustrates exemplary steps that may be performed by a processor executing instructions out of a memory when a user device is validated and when registration information regarding a wireless mesh network is received at a cloud management system. The steps of FIG. 6 may be implemented by a processor executing instructions out of a memory at cloud management system 110 of FIG. 1. Furthermore, cloud management system 510 of FIG. 5. Step 610 of FIG. 6 is a step where a secure communication connection may be established with a user device. When the secure communication connection is established the user device may provide information that can be used to help validate the user device or that may help validate a user of the user device. The information provided by the user device in step 610 may include one or more of a login request, a user identifier (ID), a password, and a security key. The secure connection established in step 610 may send information through a secure socket layer (SSL) session or a secure hypertext transfer protocol (HTTPS) tunnel. The security key that may be sent to the cloud management system may have been received by the user device when the user device scanned a quick response (QR) code like the QR code of FIG. 3 or another form of code or device that can be read or scanned by a scanner, camera, or sensor at a user device (e.g. a bar code, text, or an NFC chip). This security key can be a code uniquely identifies a particular mesh node such that the mesh node may be associated with a mesh network and with the user device when the mesh network is configured or when the mesh node is added to an existing mesh network.

After step 610, information received from the user device may be validated in step 620 of FIG. 6. Steps 610 and 620 of FIG. 6 may perform operations consistent with communications 212 and 215 of FIG. 2, when the cloud management system 110 of FIG. 1 performs processes or methods of the onboarding service 209 of FIG. 2. The validation process of step 620 may include a two-factor authentication process that may use one of or both the user ID and the one-time security key received in step 610. The two-factor authentication may include the cloud management system sending a communication to the user device via a communication channel that is different from the secure communication connection or tunnel established in step 610. For example, validation information may be sent in a text message to the user device via a cellular network. This validation information may include a security code or number that could be sent from the user device to the cloud management system as part of the validation process. The user device may send the security code or number to the cloud management system over the secure communication connection. Alternatively, the two-factor validation may include the cloud management system sending an audio message or an email message that includes the security code or number. Such two-factor authentication processes are more secure that a single factor validation process because there is a very low probability that a hacker could exploit two different communication mediums or channels simultaneously. After a security code or number is received from the user device, the device may be validated by comparing information sent via a first communication channel with information received via a second communication channel. Here again these different communication channels may be different types of communication channels that use different types of communication mediums (e.g. an email medium and a secure communication tunnel, or a cellular communication channel and a secure communication tunnel).

A two-factor authentication process may require the user device to send information to the cloud management system that identifies alternative communication channels that may be used to communicate with the user device. These alternative communication channels may be identified in communications sent over the secure communication connection. Alternate communication channels may be identified using a phone number or an email address, for example. While such two-factor authentication processes may be preferred, methods consistent with the present disclosure may use any validation process known in the art or may use validation processes that use more than two communication channels, connections, or mediums (e.g. computer network HTTPS connection, a cellular medium, and an email communication connection).

Authentication processes used to validate a user device may also include information that was generated by or that was provided by one or more mesh node devices. For example, the cloud management system may communicate directly with a mesh node when validating that the user device and the mesh node can communicate with each other via yet another communication channel. Information received by the user device via a Bluetooth® communication received from the mesh node may be sent via an HTTPS tunnel when the cloud management system validates that the user device can communicate with the mesh node. Alternatively or additionally, the cloud management system may communicate with a mesh node via a communication channel that communicates with members or proposed members of a mesh network. For example, a first mesh node may communicate directly or via a mesh portal using a cellular network after that mesh node has received information that identifies the user device. As such, a cloud management system may use information that validates that a particular user device can communicate with one or more mesh nodes when those mesh nodes and the user device are configured as part of a mesh network.

After a user device has been authenticated, a session token may be generated and sent to the user device in step 620 of FIG. 6. This session token may be a token that is unique to the current secure communication session of step 610. After the session token is provided to the user device in step 620, the user device may communicate with a mesh node device via BLE link 203 of FIG. 2 when performing functions consistent with processors or other components associated with BLE link 203 and with host 206 of FIG. 2. Note that a first processor at a mesh node may be coupled to BLE link 203 and this first processor may communicate with a second processor of host 205 when the first and the second processor execute instructions out of respective memories when performing functions consistent with the present disclosure.

After step 630, the cloud management system may receive registration information. This registration information may be received from a user device via a secure communication connection as discussed in respect to FIG. 2. Alternatively this registration information or a portion thereof may be received from mesh node devices that are being configured. In certain instances, the registration information received in step 640 may include any of a user ID, the session token sent to the user device in step 640, an authorization code, device identifying information, device serial numbers, or other information associated with the user device or with particular mesh nodes. An authentication code sent to the cloud management system in step 640 of FIG. 6 may be a code that was sent to a user device that may have originally be sent to the user device from a mesh node device using steps that may be consistent with communications 218, 221, and 224 of FIG. 2. The broadcasted message 224 may also include a serial number that identifies a particular mesh node and message 224 may include encoded or encrypted data. In certain instances, the received registration information may be encoded or encrypted.

An onboarding process implemented by the cloud management system of FIG. 6 may use information received in step 640 to validate that particular mesh node devices or the user device can be associated with a validated license in step 650 of FIG. 6. Part of this validation process could include decoding or decrypting the registration information. In certain instances, the registration information received in step 640 may include serial numbers from various different mesh node devices, other identifiers, or authorization codes associated with different respective mesh node devices. The validation step 650 of FIG. 6 may also include checking that one or more serial numbers and that one or more authorization codes correspond to devices that were manufactured by a particular manufacturer. For example, this process could be designed to operate only with mesh node devices that have been validated as having been manufactured by a particular company (e.g. Sonic Wall Inc.). In such instances, a cloud management system may access a database of information that cross-references serial number information with authorization codes that were assigned to respective devices during a manufacturing process. In an instance when a particular serial number and a respective authorization code do not match information stored in the database, the mesh node that has that particular serial number may not be allowed to join a wireless mesh network. Alternatively, when serial number and authorization information received in step match information stored in the database, the mesh node device with that matching serial number may be allowed to join a wireless mesh network.

While not illustrated in FIG. 6, information identifying that one or more devices are associated with a validated license may be stored in the database. The information stored in the database may identify a plurality of devices that are included in a particular wireless mesh network, may identify one or more user devices that can connect to that particular wireless mesh network, or may identify other characteristics of a wireless mesh network. As such, an administrator or a user may be able to access stored information when reviewing information associated with each and every mesh node in a wireless mesh network. By reviewing this information a user may be able to identify where different wireless mesh nodes are located in a wireless mesh network relative to locations where other mesh nodes are located in the wireless mesh network. As such, this information may identify that a first mesh node is a mesh portal and may identify that a second mesh node is a mesh portal that is located 3 wireless hops from the mesh portal.

Information stored at this database may also include profile or configuration information. This profile information may identify mesh nodes that are configured as a mesh portal and mesh nodes that are configured as a mesh point. The profile of a wireless mesh network may also identify type of communication traffic that can be communicated over frequency band at an 802.11 wireless network. For example, a profile may allow a 5 GHz radio band to communicate both mesh-backhaul and client traffic, where a 2.4 GHZ radio band may be configured to only transfer client traffic. After devices are associated with a validated license in step 650 of FIG. 6 a registration complete message may be sent to a user device in step 660 of FIG. 6. Profile information may include any sort of information that identifies rules or software requirements of mesh node in a wireless mesh network. This profile information may identify a maximum number of hops that may be included in a wireless mesh network or include information that identifies a number of mesh points that can communicate with a single wireless mesh point in a wireless mesh network. Software configurations associated with a profile may identify operating system version information or program applications that should be installed at different mesh nodes in a wireless mesh network. In certain instances, software configurations at a mesh node may include how respective mesh nodes store data relating to previous access requests in cache memories at the wireless mesh nodes. A single set of profile criteria may be used to control the configuration or settings at all mesh nodes in a particular wireless mesh network.

Profile information may also identify preferred methods for identifying which mesh nodes should communicate with other mesh nodes in a wireless mesh network. As such profile information could instruct mesh nodes to communicate with another mesh node based on a measures of relative signal strength, measures of signal to noise ratios, error rates, or based on measures of congestion. Here again exemplary measures of congestion may include, yet are not limited to an amount of time or average time required to send or receive communication packets, a number of devices connected to a particular mesh point, a number of communications or bytes being transmitted per unit time via particular mesh nodes, or a number of hops to a mesh portal.

Once registered particular mesh nodes have been mesh nodes in that wireless mesh network may receive configuration information, settings, or software updates from a computer at the cloud or Internet that securely sends the configuration information, settings, or software updates to the registered mesh nodes. As such, any new mesh node being added to a particular wireless mesh network may be configured in a manner consistent with a profile stored in a database of an onboarding service. In certain instances, this profile information may be stored at a user device that has been used to register a mesh node with the onboarding service.

In an instance when an additional wireless mesh node is added to an existing wireless mesh network, the process may include a user device scanning a code that is associated with the additional wireless mesh node. Here again, a mobile application like to mobile application 200 of FIG. 2 may include establishing a secure communication connection with a server that executes program code consistent with onboarding service 209.

Figure 7:
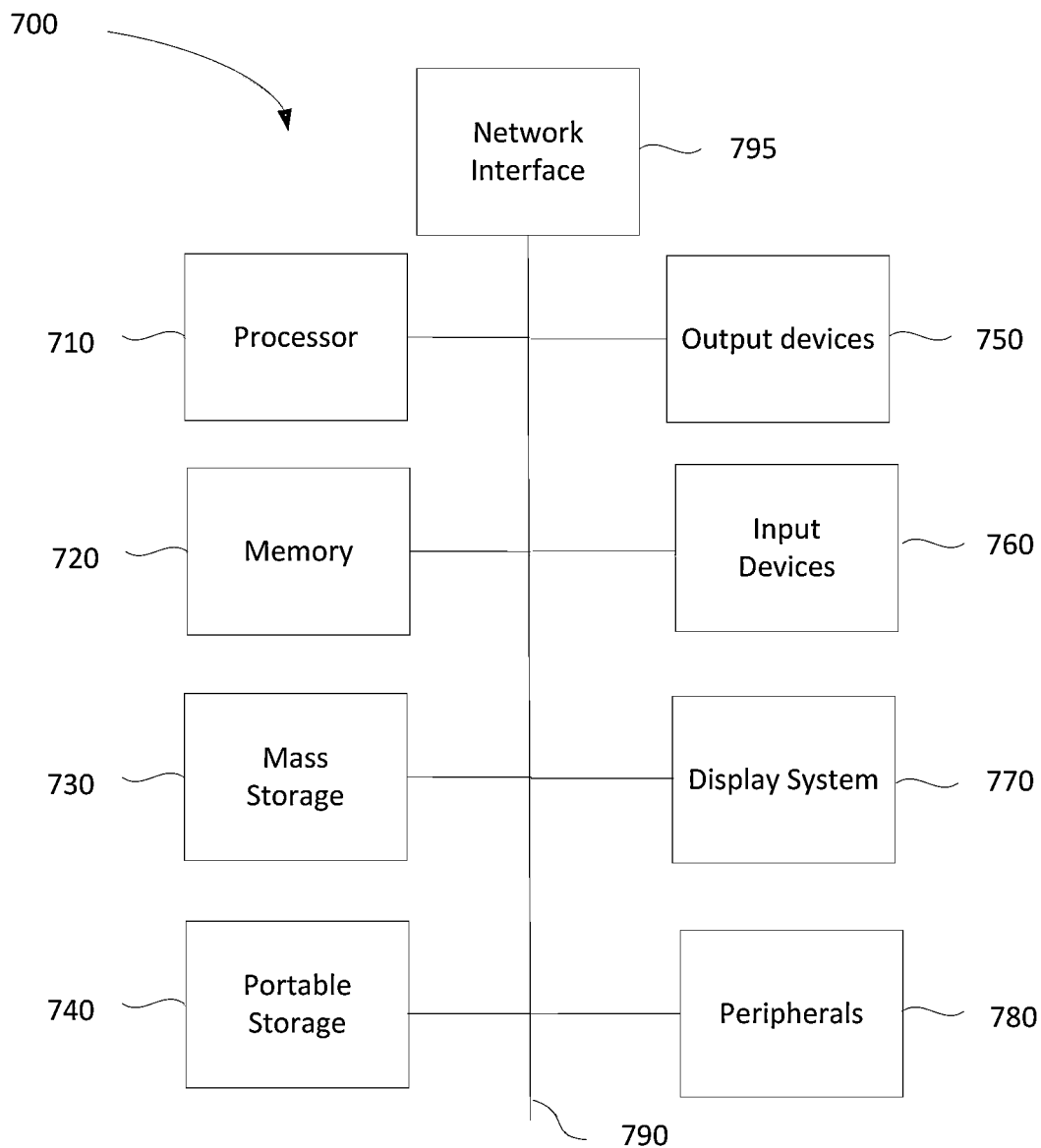
FIG. 7 illustrates a computing system that may be used to implement an embodiment of the present invention.

FIG. 7 illustrates a computing system that may be used to implement an embodiment of the present invention. The computing system 700 of FIG. 7 includes one or more processors 710 and main memory 720. Main memory 720 stores, in part, instructions and data for execution by processor 710. Main memory 720 can store the executable code when in operation. The system 700 of FIG. 7 further includes a mass storage device 730, portable storage medium drive(s) 740, output devices 750, user input devices 760, a graphics display 770, peripheral devices 780, and network interface 795.

The components shown in FIG. 7 are depicted as being connected via a single bus 790. However, the components may be connected through one or more data transport means. For example, processor unit 710 and main memory 720 may be connected via a local microprocessor bus, and the mass storage device 730, peripheral device(s) 780, portable storage device 740, and display system 770 may be connected via one or more input/output (I/O) buses.

Mass storage device 730, which may be implemented with a magnetic disk drive or an optical disk drive, is a non-volatile storage device for storing data and instructions for use by processor unit 710. Mass storage device 730 can store the system software for implementing embodiments of the present invention for purposes of loading that software into main memory 720.

Portable storage device 740 operates in conjunction with a portable non-volatile storage medium, such as a FLASH memory, compact disk or Digital video disc, to input and output data and code to and from the computer system 700 of FIG. 7. The system software for implementing embodiments of the present invention may be stored on such a portable medium and input to the computer system 700 via the portable storage device 740.

Input devices 760 provide a portion of a user interface. Input devices 760 may include an alpha-numeric keypad, such as a keyboard, for inputting alpha-numeric and other information, or a pointing device, such as a mouse, a trackball, stylus, or cursor direction keys. Additionally, the system 700 as shown in FIG. 7 includes output devices 750. Examples of suitable output devices include speakers, printers, network interfaces, and monitors.

Display system 770 may include a liquid crystal display (LCD), a plasma display, an organic light-emitting diode (OLED) display, an electronic ink display, a projector-based display, a holographic display, or another suitable display device. Display system 770 receives textual and graphical information, and processes the information for output to the display device. The display system 770 may include multiple-touch touchscreen input capabilities, such as capacitive touch detection, resistive touch detection, surface acoustic wave touch detection, or infrared touch detection. Such touchscreen input capabilities may or may not allow for variable pressure or force detection.

Peripherals 780 may include any type of computer support device to add additional functionality to the computer system. For example, peripheral device(s) 780 may include a modem or a router.

Network interface 795 may include any form of computer interface of a computer, whether that be a wired network or a wireless interface. As such, network interface 795 may be an Ethernet network interface, a BlueTooth™ wireless interface, an 802.11 interface, or a cellular phone interface.

The components contained in the computer system 700 of FIG. 7 are those typically found in computer systems that may be suitable for use with embodiments of the present invention and are intended to represent a broad category of such computer components that are well known in the art. Thus, the computer system 700 of FIG. 7 can be a personal computer, a hand held computing device, a telephone ("smart" or otherwise), a mobile computing device, a workstation, a server (on a server rack or otherwise), a minicomputer, a mainframe computer, a tablet computing device, a wearable device (such as a watch, a ring, a pair of glasses, or another type of jewelry/clothing/accessory), a video game console (portable or otherwise), an e-book reader, a media player device (portable or otherwise), a vehicle-based computer, some combination thereof, or any other computing device. The computer can also include different bus configurations, networked platforms, multi-processor platforms, etc. The computer system 700 may in some cases be a virtual computer system executed by another computer system. Various operating systems can be used including Unix, Linux, Windows, Macintosh OS, Palm OS, Android, IOS, and other suitable operating systems.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a FLASH memory, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

While various flow diagrams provided and described above may show a particular order of operations performed by certain embodiments of the invention, it should be understood that such order is exemplary (e.g., alternative embodiments can perform the operations in a different order, combine certain operations, overlap certain operations, etc.).

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claim.

What is claimed is:

1. A method for expanding wireless mesh networks, the method comprising:
    establishing a secure communication session over a first type of communication channel between a registration device and an onboarding server using a dual factor process, wherein the registration device is physically remote from the wireless mesh network and communicatively proximate to at least two wireless mesh network nodes prepared to join a wireless mesh network subject to a valid customer license;
    temporarily associating the registration device with the valid customer license upon receipt of requisite dual factor information across the first type of communication channel by the onboarding server, the requisite dual factor information responsive to a prompt across a second type of communication channel by the onboarding server;
    sending a session token from the onboarding server to the registration device upon association of the registration device with the valid customer license;
    receiving registration information from the registration device following transmission of the session token by the onboarding server; and
    configuring the at least two wireless mesh network nodes in parallel to be added to the wireless mesh network following registration of the at least two wireless network nodes in accordance with conditions of the valid customer license and configuration information received from the onboarding server.

2. The method of claim 1, further comprising: storing information in a database that identifies the registration device as being permitted to associate with the valid customer license.

3. The method of claim 1, further comprising: storing information in a database that identifies each of the wireless mesh network nodes as being permitted to associate with the valid customer license.

4. The method of claim 1, further comprising storing in a database the conditions of the valid customer license.

5. The method of claim 4, further comprising:
    receiving an update to the conditions of the valid customer license; and
    re-configuring a plurality of the wireless mesh network nodes in parallel in accordance with the updated conditions of the valid customer license.

6. The method of claim 1, further comprising: receiving information concerning compliance of each of the wireless mesh network nodes with the valid customer license.

7. The method of claim 6, wherein the information concerning compliance of each of the wireless mesh network nodes includes a type of communication traffic that can be communicated over a frequency band.

8. The method of claim 6, wherein the information concerning compliance of each of the wireless mesh network nodes includes a maximum number of hops for communication traffic in the wireless mesh network.

9. The method of claim 6, wherein the information concerning compliance of each of the wireless mesh network nodes includes a maximum number of client devices that may communicate with each of the wireless mesh network nodes.

10. A non-transitory computer-readable storage medium having embodied thereon a program executable by a processor to perform a method for expanding wireless mesh networks, the method comprising:

establishing a secure communication session over a first type of communication channel between a registration device and an onboarding server using a dual factor process, wherein the registration device is physically remote from the wireless mesh network and communicatively proximate to at least two wireless mesh network nodes prepared to join a wireless mesh network subject to a valid customer license;

temporarily associating the registration device with the valid customer license upon receipt of requisite dual factor information across the first type of communication channel by the onboarding server, the requisite dual factor information responsive to a prompt across a second type of communication channel by the onboarding server;

sending a session token from the onboarding server to the registration device upon association of the registration device with the valid customer license;

receiving registration information from the registration device following transmission of the session token by the onboarding server; and configuring the at least two wireless mesh network nodes in parallel to be added to the wireless mesh network following registration of the at least two wireless network nodes in accordance with conditions of the valid customer license and configuration information received from the onboarding server.

11. The non-transitory computer-readable storage medium of claim 10, further comprising: instructions executable to store information in a database that identifies the registration device as being permitted to associate with the valid customer license.

12. The non-transitory computer-readable storage medium of claim 10, further comprising: instructions executable to store information in a database that identifies each of the wireless mesh network nodes as being permitted to associate with the valid customer license.

13. The non-transitory computer-readable storage medium of claim 10, further comprising instructions executable to store in a database the conditions of the valid customer license.

14. The non-transitory computer-readable storage medium of claim 13, further comprising instructions executable to:
receive an update to the conditions of the valid customer license; and
re-configure a plurality of the wireless mesh network nodes in parallel in accordance with the updated conditions of the valid customer license.

15. The non-transitory computer-readable storage medium of claim 10, further comprising instructions executable to receive information concerning compliance of each of the wireless mesh network nodes with the valid customer license.

16. The non-transitory computer-readable storage medium of claim 15, wherein the information concerning compliance of each of the wireless mesh network nodes includes a type of communication traffic that can be communicated over a frequency band.

17. The non-transitory computer-readable storage medium of claim 15, wherein the information concerning compliance of each of the wireless mesh network nodes includes a maximum number of hops for communication traffic in the wireless mesh network.

18. The non-transitory computer-readable storage medium of claim 15, wherein the information concerning compliance of each of the wireless mesh network nodes includes a maximum number of client devices that may communicate with each of the wireless mesh network nodes.

19. A system for expanding wireless mesh networks, the system comprising:
at least two wireless mesh network nodes;
an onboarding server that is physically remote from a wireless mesh network and communicatively proximate to the at least two wireless mesh network nodes prepared to join a wireless mesh network subject to a valid customer license, wherein the onboarding server:
establishes a secure communication session over a first type of communication channel with a registration device using a dual factor process, and
sends a session token to the registration device upon association of the registration device with the valid customer license; and
a management system including a processor that executes instructions, wherein the execution of the instructions by the processor:
temporarily associates the registration device with the valid customer license upon receipt of requisite dual factor information across the first type of communication channel by the onboarding server, the requisite dual factor information responsive to a prompt across a second type of communication channel by the onboarding server;
receives registration information from the registration device following transmission of the session token by the onboarding server; and
configures the at least two wireless mesh network nodes in parallel to be added to the wireless mesh network following registration of the at least two wireless network nodes in accordance with conditions of the valid customer license and configuration information received from the onboarding server.

20. The system of claim 19, wherein the management system further includes memory that stores information in a database that identifies the registration device as being permitted to associate with the valid customer license.

21. The system of claim 19, wherein the management system further:
receives an update to the conditions of the valid customer license; and
re-configures a plurality of the wireless mesh network nodes in a parallel manner in accordance with the updated conditions of the valid customer license.

22. The system of claim 19, wherein the management system further receives information concerning compliance of each of the wireless mesh network nodes with the valid customer license, wherein the information concerning compliance of each of the wireless mesh network nodes includes one or more of:
a type of communication traffic that can be communicated over a frequency band;
a maximum number of hops for the communication traffic in the wireless mesh network; and
a maximum number of client devices that may communicate with each of the wireless mesh network nodes.

* * * * *